United States Patent
Zeng et al.

(10) Patent No.: US 11,863,256 B2
(45) Date of Patent: Jan. 2, 2024

(54) CHANNEL EQUALIZATION-FREE SINGLE-CARRIER BROADBAND TRANSMISSION METHOD AND SYSTEM

(71) Applicant: SOUTHEAST UNIVERSITY, Nanjing (CN)

(72) Inventors: Yong Zeng, Nanjing (CN); Haiquan Lu, Nanjing (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 17/928,431

(22) PCT Filed: Apr. 13, 2022

(86) PCT No.: PCT/CN2022/086657
§ 371 (c)(1),
(2) Date: Nov. 29, 2022

(87) PCT Pub. No.: WO2023/097945
PCT Pub. Date: Jun. 8, 2023

(65) Prior Publication Data
US 2023/0179268 A1    Jun. 8, 2023

(30) Foreign Application Priority Data
Dec. 2, 2021 (CN) .......................... 202111456547.9

(51) Int. Cl.
*H04B 7/06* (2006.01)
*H04B 7/0426* (2017.01)

(52) U.S. Cl.
CPC ........... *H04B 7/043* (2013.01); *H04B 7/0617* (2013.01)

(58) Field of Classification Search
CPC ..... H04B 7/043; H04B 7/0617; H04B 7/0671
See application file for complete search history.

(56) References Cited

U.S. PATENT DOCUMENTS 9,722,741 B1 * 8/2017 Rakib ................... H04L 1/0018
9,729,220 B1    8/2017 Harel et al.
(Continued)

FOREIGN PATENT DOCUMENTS

CN    101986631 A    3/2011
CN    108199793 A    6/2018
(Continued)

OTHER PUBLICATIONS

Gao, Qiang et al., Joint Design of Pre-equalization in Frequency Domain and Beamforming for Single-Carrier Massive MIMO System, Nov. 30, 2019, pp. 1791-1799, vol. 35, Issue 11, Journal of Signal Processing.
(Continued)

*Primary Examiner* — Kenneth T Lam
(74) *Attorney, Agent, or Firm* — MUNCY, GEISSLER, OLDS & LOWE, P.C.

(57) ABSTRACT

The present invention discloses a channel equalization-free single-carrier broadband transmission method, including the following steps: obtaining a number of temporal-resolvable multi-paths, and delays and channel gain vectors corresponding to the multi-paths based on a channel impulse response; deliberately introducing, by a transmitter, a corresponding delay for a symbol sequence, so as to perform delay compensation, so that all multi-path signal components arrive at a receiver simultaneously and constructively after propagating over a time-dispersive channel, thereby avoiding inter-symbol interference in broadband transmission; and utilizing, by the transmitter, multiple antennas to perform path-based beamforming design. A time-dispersive channel can be transformed into a frequency-flat channel by means of the path-based ZF beamforming and delay alignment modulation. The present invention further proposes a channel equalization-free single-carrier broadband transmis-
(Continued)

sion system. In the present invention, with delay alignment modulation and the path-based beamforming, the issue of inter-symbol interference in broadband communications is resolved, without requiring the channel equalization or multi-carrier transmission, thereby achieving the low-complexity single-carrier broadband communication.

5 Claims, 4 Drawing Sheets

(56) References Cited

U.S. PATENT DOCUMENTS

| | | | | |
|---|---|---|---|---|
| 2020/0389214 | A1* | 12/2020 | De Carvalho | H04B 7/0686 |
| 2021/0058114 | A1* | 2/2021 | Molisch | H04L 5/0037 |
| 2021/0194742 | A1* | 6/2021 | Zhou | H04L 27/26532 |
| 2022/0182265 | A1* | 6/2022 | Xu | H04L 25/03878 |

FOREIGN PATENT DOCUMENTS

| | | |
|---|---|---|
| CN | 108390708 A | 8/2018 |
| CN | 112636773 A | 4/2021 |
| CN | 113872657 A | 12/2021 |

OTHER PUBLICATIONS

Kilcioglu, Emre et al., Efficient User Grouping for Hybrid Beamforming in Single Carrier Wideband Massive MIMO Channels, Apr. 28, 2021, 5 pages, 2021 IEEE 93rd Vehicular Technology Conference (VTC—2021—Spring).

Huang, Zhenya et al., Research of Single Carrier Frequency-Domain Equalization for Wireless Channel, Apr. 10, 2007, pp. 1-3, Communications Technology.

* cited by examiner

CHANNEL EQUALIZATION-FREE SINGLE-CARRIER BROADBAND TRANSMISSION METHOD AND SYSTEM

TECHNICAL FIELD

The present invention relates to the field of wireless communication standardization processes, and in particular, to a channel equalization-free single-carrier broadband communication transmission method, i.e., delay alignment modulation.

BACKGROUND

Since its introduction around 1960s, orthogonal frequency-division multiplexing (OFDM) has been gradually evolved as the dominant transmission technology for broadband communication, with successful applications including the fourth-generation (4G) and fifth-generation (5G) cellular networks, and wireless local area network (WLAN). OFDM is a digital multi-carrier technology that converts high-speed serial data stream into multiple low-speed parallel data streams that are sent over closely spaced orthogonal sub-carriers with overlapping spectra, where the data in each sub-carrier experiences a frequency-flat channel. This thus enables high-rate communications while circumventing the detrimental inter-symbol interference (ISI). In addition, adaptive modulation and multiple access can be flexibly applied for OFDM, thereby effectively improving the system spectral efficiency. However, it is also well known that OFDM suffers from some critical drawbacks, for example, the high peak-to-average-power ratio (PAPR) caused by a plurality of superposed subcarriers results in nonlinear distortion of power amplifiers; the severe out-of-band (OOB) emission causes interference to adjacent channels; and the carrier frequency offset (CFO) destroys the orthogonality among sub-carriers, incurring performance loss of OFDM.

To tackle the above issues of OFDM, numerous work has been done in both the academia and industry. For example, for the high PAPR issue, a simple method is amplitude clipping for OFDM signals, so that the signal amplitude is limited below a given threshold. As an alternative of OFDM without suffering from the high PAPR issue, single-carrier frequency-division equalization (SC-FDE) has been adopted by 4G and 5G uplink communications, thereby reducing the linearity requirement of power amplifiers at the receiver side. For the severe OOB emission with large sidelobe and slow attenuation in the frequency domain, the windowing and filtering approaches can be applied. Moreover, as an alternative waveform to OFDM, filter bank multi-carrier (FBMC) modulation uses a bank of parallel sub-band filters, where the prototype filter can effectively suppress out-of-band emission and mitigate the ISI. In addition, in high-mobility scenarios, wireless communications are vulnerable to the Doppler effect, which are exacerbated at high carrier frequencies such as millimeter wave (mmWave) and Terahertz communications, thereby destroying the orthogonality among OFDM sub-carriers. To this end, a new technique termed orthogonal time frequency space (OTFS) is proposed recently. By transforming the doubly-selective channel into a two-dimensional channel in the delay-Doppler domain and performing equalization, all symbols over a transmission frame experience the same channel gain. This renders OTFS effective in high-mobility communication scenarios.

However, although the above technologies alleviate the corresponding issues suffered by OFDM to some extent, which incur performance loss or require complicated signal processing. For example, amplitude clipping inevitably causes distortion to OFDM signals, which increases the system bit error rate. In addition, compared with OFDM, FBMC adopts a bank of filters at the transmitter side and the receiver side, which significantly increases the system implementation complexity and cost. Lastly, OTFS modulation requires a series of complex two-dimensional transformation. Therefore, these complex multi-carrier modulation technologies further increase signal processing complexity at the transmitter side and the receiver side, rendering the power consumption and cost issues more pronounced.

The above analysis shows that it is of paramount importance to study a new low-complexity broadband transmission method for future mobile communications. Note that the single-carrier modulation can effectively avoid the issues of OFDM and other multi-carrier techniques, such as the high PAPR, the severe OOB emission, as well as the vulnerability to CFO. For the single-carrier modulation, conventional time-domain equalization compensates the channel characteristic by using the finite impulse response (FIR) filter with multiple taps, so as to mitigate the effect of the ISI issue. However, for channels with severe delay spread, more taps are needed to mitigate the ISI, which significantly increases equalization complexity and cost, and also becomes a bottleneck that restricts performance of a single-carrier system. Besides, the channel characteristic may also be compensated in the frequency domain, so that the entire system approaches the ISI-free condition, i.e., single-carrier frequency domain equalization (SC-FDE) technique. However, SC-FDE needs discrete Fourier transform (DFT) and inverse discrete Fourier transform (IDFT) operations at the receiver side, which increases the receiver signal processing complexity.

SUMMARY

To tackle the above issues, the present invention proposes a channel equalization-free single-carrier broadband communication transmission method, so as to resolve the detrimental ISI caused by the time-dispersive channel in broadband communications, by exploiting the multi-path sparsity of mmWave and Terahertz channels and the abundant spatial dimension brought by large antenna arrays. The single-carrier delay alignment modulation avoids practical issues suffered by OFDM and other multi-carrier technologies, such as the high PAPR, the severe OOB emission, as well as the vulnerability to Doppler frequency offset, which enables the low-complexity and channel equalization-free single-carrier broadband communication.

To tackle the above issues, the following technical solutions are used in the present invention:

The present invention provides a channel equalization-free single-carrier delay alignment modulation method, including the following steps:

(1) obtaining a number of temporal-resolvable multi-paths, and delays and channel gain vectors corresponding to the multi-paths based on a channel impulse response;

(2) deliberately introducing, by a transmitter, a corresponding delay for a symbol sequence within a channel coherence time $T_c$, so as to perform delay compensation, so that all multi-path signal components arrive at a receiver simultaneously and constructively after propagating over a time-dispersive channel;

(3) utilizing, by the transmitter, multiple antennas to perform path-based beamforming design, wherein when a number of transmit antennas is not smaller than the number of the temporal-resolvable multi-paths, path-based zero-forcing (ZF) beamforming is used to completely eliminate inter-symbol interference (ISI); or when the number of transmit antennas is smaller than the number of the temporal-resolvable multi-paths, path-based maximal-ratio transmission (MRT) or minimum mean-square error (MMSE) beamforming design is used;

(4) at the end of the moment $T_c$, determining, by the transmitter or the receiver, whether the communication process ends; and (5) if the communication ends, ending the process; and if communication continues, repeating the steps (1) to (4) until the communication ends.

Further, in the channel equalization-free single-carrier delay alignment modulation method proposed in the present invention, in the step (1), each temporal-resolvable multi-path corresponds to multiple sub-paths with different angles of departure (AoDs).

Further, in the channel equalization-free single-carrier delay alignment modulation method proposed in the present invention, in the step (2), delay compensation is performed for a symbol transmitted on each multi-path, and a pre-compensation value is equal to a maximum delay among all the multi-paths minus the delay of the corresponding multi-path.

Further, in the channel equalization-free single-carrier delay alignment modulation method proposed in the present invention, in the step (3), when the transmitter uses the path-based ZF beamforming, a beamforming vector corresponding to each multi-path is orthogonal to channel gain vectors of all other multi-paths; and for each multi-path, one orthogonal projection matrix is constructed, and the channel gain vector of the multi-path is projected into an orthogonal space of the channel gain vectors of all other multi-paths, so as to obtain a path-based ZF beamforming vector of the multi-path.

Further, in the channel equalization-free single-carrier delay alignment modulation method proposed in the present invention, with delay alignment modulation and path-based ZF beamforming, all the multi-path signal components arrive at the receiver simultaneously after propagating over the time-dispersive channel, i.e., the receiver receives the multi-path signal components with an identical delay, whose value is equal to the maximum delay among all the multi-paths.

Further, in the channel equalization-free single-carrier delay alignment modulation method proposed in the present invention, in the step (2), one guard interval is set in each channel coherence block, and the duration of the guard interval is equal to a maximum delay among all the channel coherence blocks.

The present invention further proposes a channel equalization-free single-carrier delay alignment modulation system, where a number of delay compensation modules and a number of path-based beamforming modules are equal to a number of temporal-resolvable multi-paths based on a channel impulse response, an input is a single-carrier signal, and an output is the superposed signals after delay compensation and path-based beamforming;

the delay compensation module introduces a corresponding delay for a transmitted symbol sequence within a channel coherence time $T_c$; and the path-based beamforming module is configured to: when a number of transmit antennas is not smaller than the number of the temporal-resolvable multi-paths, use path-based ZF beamforming to completely eliminate ISI; or when the number of transmit antennas is smaller than the number of the temporal-resolvable multi-paths, use path-based MRT or path-based MMSE beamforming design.

Further, the delay compensation module deliberately introduces a delay for the transmitted symbol sequence over each multi-path, and a pre-compensation value is equal to a maximum delay among all the multi-paths minus the delay of the corresponding multi-path.

In the present invention, the foregoing technical solutions have the following technical effects compared with the prior art:

1. In this method, by exploiting the multi-path sparsity of mmWave and Terahertz channels and the abundant spatial dimension brought by large antenna arrays, the low-complexity channel equalization-free single-carrier broadband communication transmission is achieved with delay compensation and the path-based ZF beamforming.

2. This method effectively avoids practical issues of the high signal processing complexity in the conventional channel equalization-based single-carrier transmission, and the high PAPR, the severe OOB emission, as well as the vulnerability to the Doppler frequency offset suffered by OFDM and other multi-carrier transmission. The per-path delay compensation only needs to time-shift the sequence at the transmitter, thereby reducing the implementation complexity.

3. In this method, only one guard interval needs to be inserted in each channel coherence block to avoid ISI across different channel coherence blocks. Compared with OFDM that inserts the cyclic prefix (CP) at each symbol, the spectral efficiency is significantly improved by reducing the guard interval overhead.

DETAILED DESCRIPTION

Figure 1:
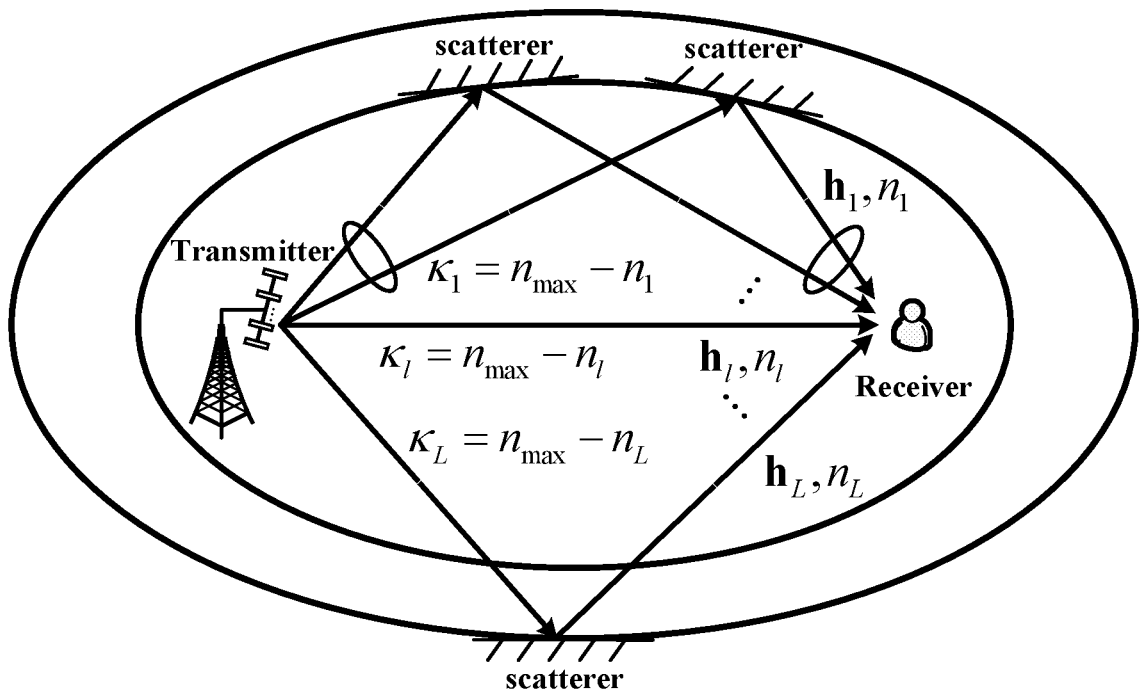
FIG. 1 is a schematic diagram of a delay alignment modulation communication system according to an embodiment of the present invention.

Exemplary embodiments are described in detail herein, and examples thereof are shown in the accompanying drawings.

It should be understood for a technical person in the art that, unless otherwise defined, all terms (comprising technical and scientific terms) used herein have the same meaning as commonly understood by one of ordinary skill in the art to which the present invention belongs. It should be further understood that, the terms such as those defined in a dictionary should be understood as meanings consistent with the meanings in the context in the related technology, and should not be explained as meanings that are idealized or excessively formal, unless the terms are clearly defined herein.

An embodiment of the present invention provides a new channel equalization-free single-carrier broadband communication transmission method, i.e., delay alignment modulation. A transmitter deliberately introduces the corresponding delay for the symbol sequence to perform delay compensation, so that all multi-path signal components arrive at the receiver simultaneously and constructively after propagating over the time-dispersive channel, thereby avoiding the ISI issue in broadband transmission. In addition, the path-based beamforming is performed with the multiple antennas. As a result, the time-dispersive channel can be transformed into the frequency-flat channel by means of delay compensation and the path-based ZF beamforming.

The method includes the following main content (for a specific implementation, refer to the following detailed description and example embodiment description):

a) The number of temporal-resolvable multi-paths, and delays and channel gain vectors corresponding to the multi-path are obtained based on a channel impulse response;

b) a transmitter inserts a guard interval for each channel coherence block with duration $T_c$, and deliberately introduces the corresponding delay for the symbol sequence to perform delay compensation, so that all multi-path signal components arrive at the receiver simultaneously and constructively after propagating over the time-dispersive channel;

c) when the number of transmit antennas is no smaller than that of the temporal-resolvable multi-paths, the path-based ZF beamforming can be used to completely eliminate ISI; on the other hand, the low-complexity path-based MRT beamforming or the optimal path-based MMSE beamforming may be made;

d) at the end of the moment $T_c$, the transmitter or the receiver determines whether a communication process ends; and if communication ends, the process is completed; and e) if communication continues, process a) to d) is repeated until the process ends.

Delay alignment modulation leverages the multi-path sparsity of mmWave and Terahertz channels and the abundant spatial dimension brought by large antenna arrays. When the spatial dimension of the transmitter is much larger than the number of temporal-resolvable multi-paths, the per-path delay compensation may be performed, so that all multi-path signal components arrive at the receiver simultaneously and constructively after propagating over the time-dispersive channel.

Based on the channel impulse response, the delay alignment modulation method consists of delay compensation and path-based beamforming modules, whose number are equal to that of the temporal-resolvable multi-paths. An input to the delay alignment modulation method is a single-carrier signal, and an output is the superposed signals after per-path delay compensation and path-based beamforming.

In step b), the per-path delay compensation may be achieved by means of time shift, and the pre-compensation value of each multi-path is equal to the maximum delay among all the multi-paths minus its delay.

According to an antenna configuration of the transmitter and a time-dispersive channel characteristic, the transmitter selects a proper path-based beamforming scheme. When the number of transmit antennas is no smaller than that of the temporal-resolvable multi-paths, the path-based ZF beamforming is used to completely eliminate ISI. In this case, the receiver receives the multi-path signal components with an identical delay, whose value is equal to the maximum delay among all the multi-paths. All the multi-path signal components contribute to the improvement of the received signal-to-noise ratio (SNR), which enables a low-complexity channel equalization-free single-carrier broadband communication. On the other hand, when the number of transmit antennas is smaller than that of the temporal-resolvable multi-paths, the low-complexity path-based MRT or the optimal path-based MMSE beamforming may be used.

In step c), for the path-based ZF beamforming, one orthogonal projection matrix may be constructed for each multi-path, and the channel gain vector of this multi-path is projected into an orthogonal space of all other multi-paths' channel gain vectors, so as to obtain its path-based ZF beamforming vector.

For a sparse time-dispersive channel in mmWave/Terahertz communication and/or a large antenna array at the transmitter, the performance of the path-based MRT beamforming approaches that of the path-based ZF beamforming. In this case, the low-complexity MRT beamforming can effectively mitigate the effect of the ISI, thus achieving channel equalization-free single-carrier broadband communication transmission.

Within each channel coherence time, delay alignment modulation requires insertion of one guard interval to avoid ISI across different channel coherence blocks, and duration of the guard interval is equal to the maximum delay among all the channel coherence blocks.

The method is not only applicable to a single-user communication scenario, but also applicable to a multi-user communication scenario. For the multi-user communication scenario, delay alignment modulation may be compatible with different multiple access schemes.

FIG. 1 is a schematic diagram of delay alignment modulation according to an exemplary embodiment, and it can be seen that each temporal-resolvable multi-path may correspond to multiple sub-paths with different AoDs.

Figure 2:
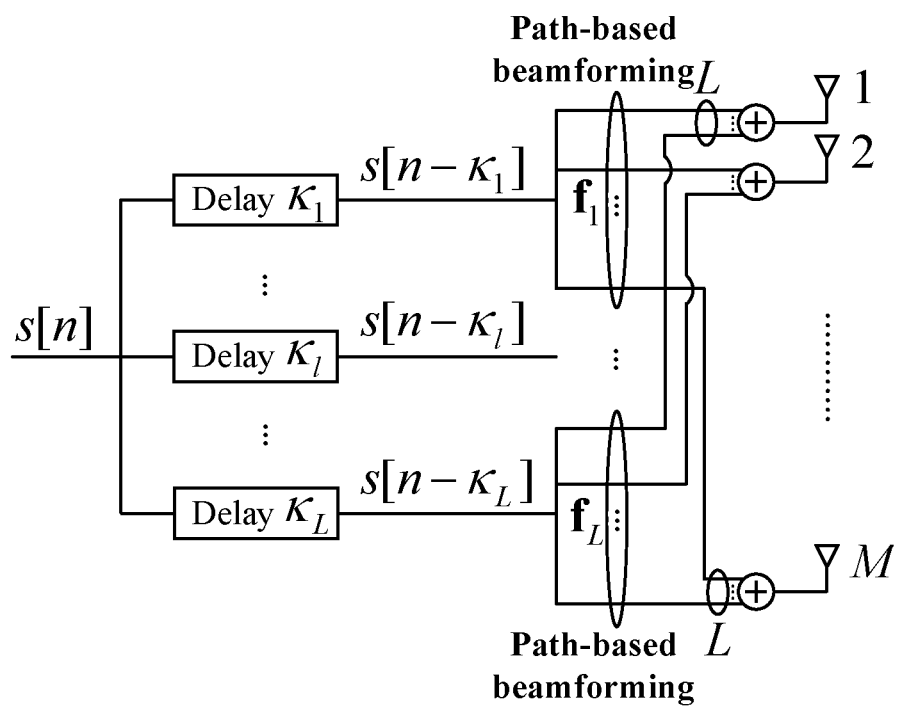
FIG. 2 is a schematic architecture diagram of a transmitter for a delay alignment modulation according to an embodiment of the present invention.

FIG. 2 is a schematic architecture diagram of a delay alignment modulation transmitter according to an exemplary embodiment. After performing per-path delay compensation for the symbol sequence over each multi-path, together with the path-based beamforming, the signal is transmitted.

Let L denote the number of temporal-resolvable multi-paths, h 1 denote the channel gain vector for the lth multi-path, and $n_l$ represent the corresponding delay. The discrete-time equivalent of the channel impulse response can be expressed as $$h^H[n] = \sum_{l=1}^{L} h_l^H \delta[n - n_l]$$

where n is the symbol index. Let s[n] be the independent and identically distributed (i.i.d.) information-bearing symbols. With delay alignment modulation, the transmitted signal is $$x[n] = \sum_{l=1}^{L} f_l s[n - \kappa_l]$$

where $K_l$ is the deliberately introduced delay for the lth multi-path at the transmitter, with $K_l \neq K_{l'}$, $\forall l \neq l'$, and $f_l$ denotes the path-based beamforming vector. The received signal for delay alignment modulation is $$y[n] = h^H[n] * x[n] + z[n] =$$

$$\sum_{l=1}^{L} h_l^H f_l s[n - \kappa_l - n_l] + \sum_{l=1}^{L} \sum_{l' \neq l}^{L} h_l^H f_{l'} s[n - \kappa_{l'} - n_l] + z[n]$$

where * represents the linear convolution operation, and z[n] denotes the additive white Gaussian noise (AWGN). Let M denote the number of transmit antennas, $L = \{l : l = 1, \ldots, L\}$ be the set of all temporal-resolvable multi-paths, and $L_{l'} = L \setminus l$ include all other multi-paths excluding multi-path l. Let $Q_l$ denote the orthogonal projection matrix to perform the path-based ZF beamforming for the symbol sequence over the multi-path l, and C be an interference-plus-noise covariance matrix in the path-based MMSE beamforming. Denote by $T_c$ and $T_s$ the channel coherence time and the symbol duration, respectively, and $n_c$ the number of single-carrier symbols within each channel coherence time. Let $n_{min}$ and $n_{max}$ denote the minimum and maximum delay within the current channel coherence block, and n span be the channel delay spread. The delay difference between multi-path l' and l is represented by $\Delta_{l',l}$, and the maximum delay among all the channel coherence blocks is represented by $\tilde{n}_{max}$. Denote by P and $\sigma^2$ the available power of the transmitter and the power of AWGN, respectively, and $I_M$ an identity matrix whose dimension is M×M.

Based on the foregoing definitions, specific implementation steps of the proposed method may be summarized as follows:

(1) obtaining the number of temporal-resolvable multi-paths L, and their corresponding delay $\{n_l\}$ and channel gain vectors $\{h_l\}$ based on the channel impulse response;

(2) calculating the minimum delay $n_{min} = \min n_l$ and the maximum delay $n_{max} = \max n_l$ for the time-dispersive channel, where $1 \leq l \leq L$;

(3) calculating the channel delay spread $n_{span} = n_{max} - n_{min}$ of the time-dispersive channel;

(4) setting the pre-compensation delay value of each multi-path as $K_l = n_{max} - n_l$, where $1 \leq l \leq L$, and the received signal for delay alignment modulation is $$y[n] = \left(\sum_{l=1}^{L} h_l^H f_l\right) s[n - n_{max}] + \sum_{l=1}^{L} \sum_{l' \neq l}^{L} h_l^H f_{l'} s[n - n_{max} + n_{l'} - n_l] + z[n];$$

(5) selecting a proper path-based beamforming design scheme according to the relationship between the number of transmit antennas M and that of temporal-resolvable multi-paths L; when M≥L, the path-based ZF beamforming is used; for the lth multi-path, let $H_l = [h_1, \ldots, h_{l-1}, h_{l+1}, \ldots, h_L]$ denote the matrix formed by channel gain vectors of other multi-paths excluding multi-path l, and $Q_l = I_M - H_l(H_l^H H_l)^{-1} H_l^H$ be the orthogonal projection matrix, the path-based ZF beamforming vector is set as $$f_l^{ZF} = \sqrt{P} Q_l h_l / \sqrt{\sum_{l=1}^{L} \|Q_l h_l\|^2},$$

where $1 \leq l \leq L$;

(6) When M<L, the transmitter may select the path-based MRT beamforming or the path-based MMSE beamforming; if low-complexity path-based MRT beamforming is used, step (7) is performed; and if the optimal path-based MMSE beamforming to maximize the signal-to-interference-plus-noise ratio (SINR) is used, step (8) is performed;

$$f_l^{MRT} = \sqrt{P} h_l / \sqrt{\sum_{l=1}^{L} \|h_l\|^2},$$

(7) setting the path-based MRT beamforming vector as where $1 \leq l \leq L$;

(8) calculating the delay difference $\Delta_{l,l'} = n_{l'} - n_l$, $\forall l \neq l'$ between multi-path l' and l, we have $\Delta_{l,l'} \in \{\pm 1, \ldots, \pm n_{span}\}$; Since the interfering symbols with identical delay difference correspond to identical symbols, they need to be combined; for delay difference $i \in \{\pm 1, \ldots, \pm n_{span}\}$, define the following equivalent channel:

$$g_{l'}^H \triangleq \begin{cases} h_l^H, & \text{If } \exists l \in L_{l'}, \text{ s.t. } n_{l'} - n_l = i \\ 0, & \text{Otherwise} \end{cases}$$

the received signal can be equivalently expressed as:

$$y[n] = \left(\sum_{l=1}^{L} h_l^H f_l\right) s[n - n_{max}] + \sum_{i=-n_{span}, i \neq 0}^{n_{span}} \left(\sum_{l'=1}^{L} g_{l'}^H[i] f_{l'}\right) s[n - n_{max} + i] + z[n]$$

Let $\bar{h} = [h_1^T, \ldots, h_L^T]^T$, and $\bar{g}[i] = [g_1^T[i] g_L^T[I]]^T$ the interference-noise covariance matrix is $C = \Sigma_{i \neq 0} \bar{g}[i] \bar{g}^H[i] + (\sigma^2/P)I$; Based on the MMSE criterion, we have $\bar{f}^{MMSE} = \sqrt{PC^{-1}\bar{h}}/\|C^{-1}\bar{h}\|$; the path-based MMSE beamforming is set as $$f_l^{MMSE} = \bar{f}_{lM+1:(l+1)M}^{MMSE}, \text{ where } 1 \leq l \leq L;$$

Figure 3:
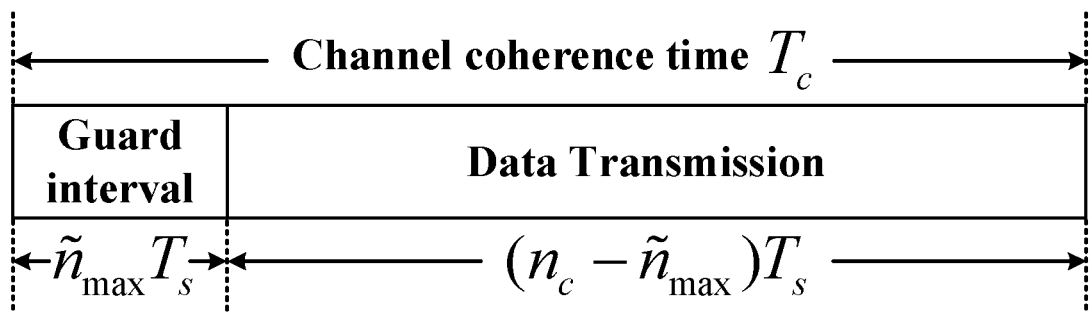
FIG. 3 is a schematic structural diagram of a channel coherence time block for a delay alignment modulation according to an embodiment of the present invention.

(9) determining the transmitted signal x[n] for delay alignment modulation according to the used path-based beamforming vector;

(10) as shown in FIG. 3, a guard interval of length $\tilde{n}_{max}$ is inserted at the beginning of the channel coherence block, with a guard interval overhead of $\tilde{n}_{max}/\tilde{n}_c$, and the signals are started to be transmitted;

(11) if the transmitter uses the path-based ZF beamforming, the received signal is $$y[n] = \left(\sum_{l=1}^{L} h_l^H f_l^{ZF}\right) s[n - n_{max}] + z[n],$$

in this case, the channel equalization-free single-carrier transmission can be achieved; for the path-based MRT beamforming or the path-based MMSE beamforming, either the complexity is further reduced or the received SINR is improved by tolerating some residual ISI;

(12) at the end of the moment $T_c$, determining whether the communication process ends; and if the communication ends, the communication process is completed; and

(13) if communication continues, repeating steps (1) to (12) until the communication ends.

Figure 4:
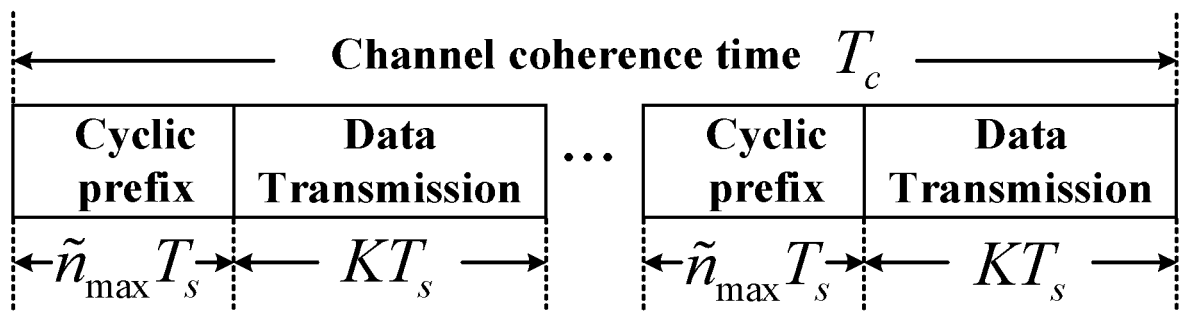
FIG. 4 is a schematic structural diagram of a channel coherence time block for conventional OFDM according to an embodiment of the present invention.

In the foregoing method, by leveraging the multi-path sparsity of mmWave and Terahertz channels and the abundant spatial dimension brought by large antenna array, the per-path delay compensation and the path-based beamforming can be effectively performed for the symbol sequence over each multi-path (steps (4) to (8)). Besides, only one guard interval is needed for each channel coherence block to avoid ISI across different channel coherence blocks (step (10)). Compared with OFDM, as shown in FIG. 4, the guard interval overhead can be significantly reduced.

The foregoing descriptions are merely some implementations of the present invention. It should be noted that a person of ordinary skill in the art may make several improvements or refinements without departing from the principle of the present invention and the improvements or refinements shall fall within the protection scope of the present invention.

What is claimed is:

1. A channel equalization-free single-carrier delay alignment modulation method, comprising the following steps:
   S1: obtaining a number of temporal-resolvable multi-paths, and delays and channel gain vectors corresponding to the multi-paths based on a channel impulse response;
   S2: deliberately introducing, by a transmitter, a corresponding delay for a symbol sequence within a channel coherence time $T_c$, so as to perform delay compensation, so that all multi-path signal components arrive at a receiver simultaneously and constructively after propagating over a time-dispersive channel, wherein the delay compensation is performed based on a pre-compensation value, and the pre-compensation value is equal to a maximum delay among all the multi-paths minus the delay of the corresponding multi-path;
   S3: utilizing, by the transmitter, multiple antennas to perform path-based beamforming design, wherein when a number of transmit antennas is not smaller than the number of the temporal-resolvable multi-paths, path-based zero-forcing (ZF) beamforming is used to completely eliminate inter-symbol interference (ISI); or when the number of transmit antennas is smaller than the number of the temporal-resolvable multi-paths, path-based maximal-ratio transmission (MRT) or minimum mean-square error (MMSE) beamforming design is used;
   S4: at the end of the moment $T_c$, determining, by the transmitter or the receiver, whether the communication process ends; and
   S5: if the communication process ends, ending the process; and if communication continues, repeating the steps S1 to S4 until the communication ends.

2. The channel equalization-free single-carrier delay alignment modulation method according to claim 1, wherein in the step S1, each temporal-resolvable multi-path corresponds to multiple sub-paths with different angles of departure (AoDs).

3. The channel equalization-free single-carrier delay alignment modulation method according to claim 1, wherein in the step S3, when the transmitter uses the path-based ZF beamforming, a beamforming vector corresponding to each multi-path is orthogonal to channel gain vectors of all other multi-paths; and for each multi-path, one orthogonal projection matrix is constructed, and the channel gain vector of the multi-path is projected into an orthogonal space of the channel gain vectors of all other multi-paths, so as to obtain a path-based ZF beamforming vector of the multi-path.

4. The channel equalization-free single-carrier delay alignment modulation method according to claim 1, wherein with delay alignment modulation and path-based ZF beamforming, all the multi-path signal components arrive at the receiver simultaneously after propagating over the time-dispersive channel, i.e., the receiver receives the multi-path signal components with an identical delay, whose value is equal to the maximum delay among all the multi-paths.

5. The channel equalization-free single-carrier delay alignment modulation method according to claim 1, wherein in the step S2, one guard interval is set in each channel coherence block, and duration of the guard interval is equal to a maximum delay among all the channel coherence blocks.

* * * * *